United States Patent
Hammad

(10) Patent No.: US 8,056,177 B2
(45) Date of Patent: Nov. 15, 2011

(54) LEAF GATHERING APPARATUS

(76) Inventor: Adnan A. Hammad, Bloomfield, NJ (US)

( * ) Notice: Subject to any disclaimer, the term of this patent is extended or adjusted under 35 U.S.C. 154(b) by 0 days.

(21) Appl. No.: 12/777,822

(22) Filed: May 11, 2010

(65) Prior Publication Data

US 2010/0287903 A1 Nov. 18, 2010

Related U.S. Application Data

(60) Provisional application No. 61/215,932, filed on May 12, 2009.

(51) Int. Cl.
*E01H 1/02* (2006.01)

(52) U.S. Cl. .......... 15/78; 15/82; 15/83; 15/84; 15/349; 56/344; 56/345

(58) Field of Classification Search .......... 15/78, 82–84, 15/363, 383, 348, 349; 56/341, 344, 345, 56/350, 351, 358, 362, 364
See application file for complete search history.

(56) References Cited

U.S. PATENT DOCUMENTS

| | | | | |
|---|---|---|---|---|
| 542,808 | A * | 7/1895 | Reagan | 15/84 |
| 1,954,593 | A * | 4/1934 | Kuly | 171/17 |
| 2,302,973 | A * | 11/1942 | Sargent | 172/33 |
| 2,514,945 | A * | 7/1950 | Fortier | 56/328.1 |
| 2,679,133 | A * | 5/1954 | Soderholm | 56/328.1 |
| 2,696,777 | A * | 12/1954 | Sutch | 100/11 |
| 3,423,910 | A * | 1/1969 | Takatsugu et al. | 56/13.3 |
| 3,641,754 | A * | 2/1972 | Anstee | 56/341 |
| 3,777,327 | A * | 12/1973 | Ellis | 15/84 |
| 3,868,063 | A * | 2/1975 | Slaker | 241/101.763 |
| 4,328,603 | A * | 5/1982 | Dickson et al. | 15/84 |
| 4,550,465 | A * | 11/1985 | Chrisley | 15/84 |
| 4,593,426 | A | 6/1986 | Chrisley | |
| 6,820,542 | B1 | 11/2004 | Truitt | |
| 6,854,255 | B1 * | 2/2005 | Emerson | 56/330 |
| 6,940,742 | B2 * | 9/2005 | Yamamura | 365/145 |
| 7,322,177 | B2 * | 1/2008 | Geraghty | 56/344 |
| 7,810,202 | B2 * | 10/2010 | Fitzgerald | 15/79.1 |
| 2007/0220857 | A1 | 9/2007 | Derby | |

* cited by examiner

*Primary Examiner* — Alicia Torres
(74) *Attorney, Agent, or Firm* — Dale J. Ream

(57) ABSTRACT

A leaf gathering apparatus includes upper and lower conveyor axes, a conveyor extending around the upper and lower conveyor axes that is continuously rotatable, and a rotatable sweeping mechanism having a generally horizontal axis of rotation, the sweeping mechanism being configured to move leaves from a ground surface onto the conveyor. The apparatus includes a bag and a channel extending from the conveyor to the bag to direct leaves therebetween. A shredder is located along the channel. A frame, the upper and lower conveyor axes, and the sweeping mechanism are operatively coupled to the frame. A plurality of wheels are operatively coupled to the frame to allow the frame to be easily transported and a motor is operatively coupled to the sweeping mechanism to rotate the sweeping mechanism, the motor being operatively coupled to at least one of the upper and lower conveyor axes to rotate the conveyor.

5 Claims, 10 Drawing Sheets

LEAF GATHERING APPARATUS

REFERENCE TO RELATED APPLICATIONS

This non-provisional patent application claims the benefit of provisional application Ser. No. 61/215,932 filed on May 12, 2009, titled Pick n' Bag Leaf Cart.

BACKGROUND OF THE INVENTION

This invention relates generally to machines for gathering articles and, more particularly, to a motorized apparatus for sweeping a lawn of debris such as grass and leaves into a container either directly or through a shredder or mulcher.

A lawn that is moderately or heavily covered in leaves may require raking and then bagging the debris. This is typically done by an individual using a hand rake and then slowly depositing pile after pile into bags for collection. Even if a lawn full of leaves is mowed first with a lawn mower, large portions of leaves are not sufficiently "mulched" and remain to be collected. In this case, grass, twigs, and other debris may need to be raked and collected.

Various devices have been proposed in the art for sweeping and gathering debris from a ground surface for deposit into a bag or other receptacle. Although assumably effective for their intended purposes, the existing devices have primarily been large commercial devices that must be towed behind a motorized vehicle or are not entirely effective at efficiently collecting debris that includes dirt particles that need to be separated from leafy or grassy material Further, the existing devices and proposals have not included a wheeled vehicle that, using a conveyor, operates a conveyor and shredder as a result of wheeled movement.

Therefore, it would be desirable to have a leaf gathering apparatus particularly configured to gather leaves and similar organic debris into a bag receptacle by sweeping it onto a conveyor operated by movement of its wheels. Further, it would be desirable to have a leaf gathering apparatus configured to shred gathered material before depositing it into the receptacle. In addition, it would be desirable to have a leaf gathering apparatus that may be motorized and have user controls for selective activation by a user. The leaf gathering apparatus according to the present invention provides picking up and bagging leaves in only one step unlike any device on the market today.

SUMMARY OF THE INVENTION

Accordingly, a leaf gathering apparatus according to the present invention includes upper and lower conveyor axes, a conveyor extending around the upper and lower conveyor axes and being continuously rotatable, and a rotatable sweeping mechanism having a generally horizontal axis of rotation, the sweeping mechanism being located to move leaves from a ground surface onto the conveyor. The apparatus includes a bag and a channel extending from the conveyor to the bag to direct leaves from the conveyor to the bag. A shredder is located along the channel. A frame, the upper and lower conveyor axes and the sweeping mechanism are operatively coupled to the frame. A plurality of wheels are operatively coupled to the frame to allow the frame to be easily transported and a motor is operatively coupled to the sweeping mechanism to rotate the sweeping mechanism, the motor being operatively coupled to at least one of the upper and lower conveyor axes to rotate the conveyor.

Therefore, a general object of this invention is to provide a leaf gathering apparatus for sweeping leaves and other debris onto a conveyor for deposit into an attached receptacle.

Another object of this invention is to provide a leaf gathering apparatus, as aforesaid, in which the sweeping mechanism and conveyor are operated by rotation of the wheels.

Still another object of this invention is to provide a leaf gathering apparatus, as aforesaid, that may be pushed by a user or propelled by a battery operated motor.

Yet another object of this invention is to provide a shredder positioned between the conveyor and a bag and selectively actuated by user controls.

A further object of this invention is to provide a leaf gathering apparatus, as aforesaid, that is easy to operate and inexpensive to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 8b is an isolated view on an enlarged scale taken from a portion of FIG. 8a;

DESCRIPTION OF THE PREFERRED EMBODIMENT

Figure 1:
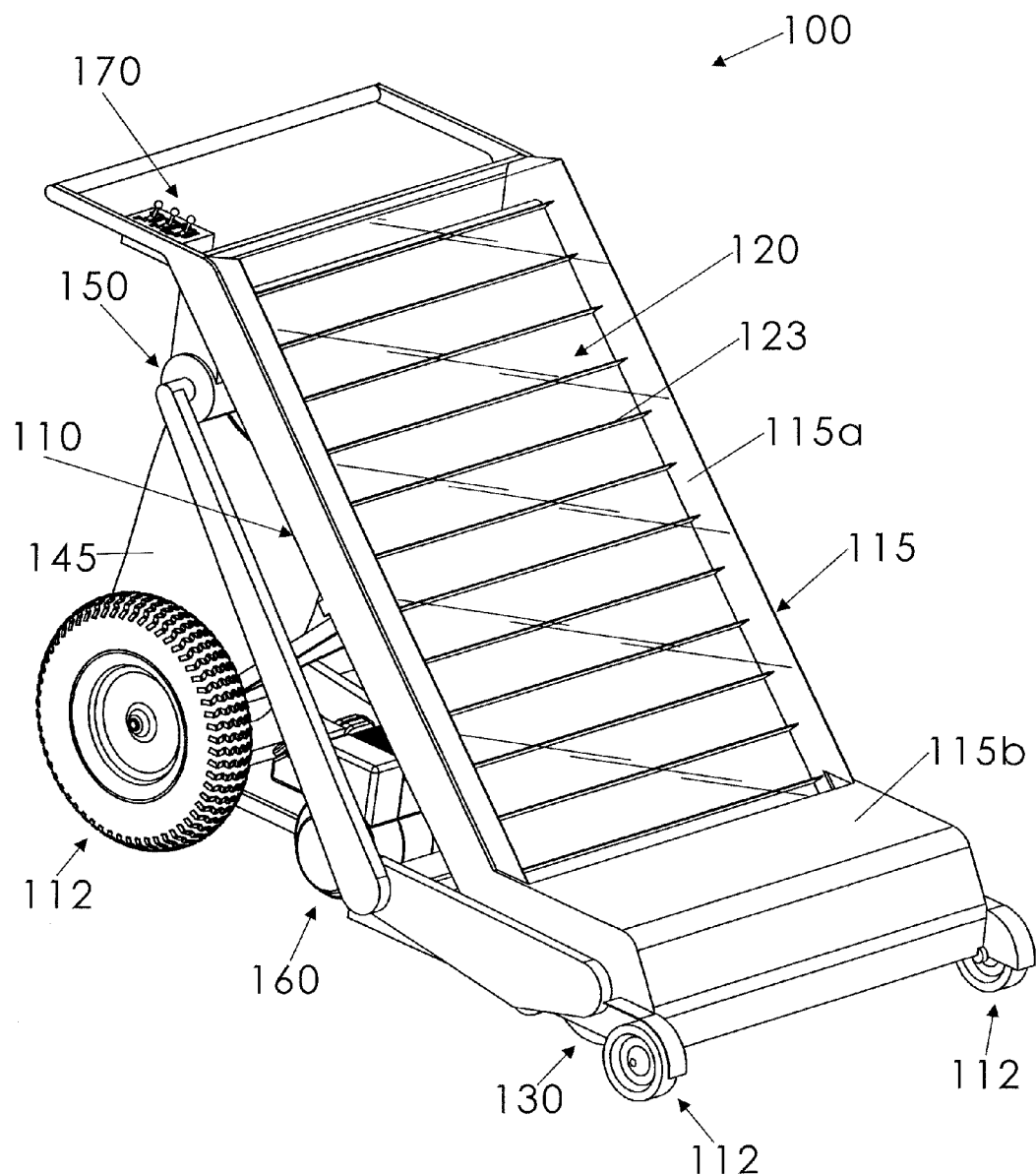
FIG. 1 is a perspective view of a leaf gathering apparatus according to a preferred embodiment of the present invention.

Leaf gathering apparatus according to the present invention will now be described in detail with reference to FIGS. 1 through 10 of the accompanying drawings. More particularly, a leaf gathering apparatus 100 according to one embodiment includes a frame 110, a conveyor 120, and a rotatable sweeping mechanism 130.

The frame 110 (shown throughout the drawings) may be a unitary (i.e., one-piece) frame, or may be multiple independent or linked pieces. Suitable materials for the frame 110 may include, for example, metals, plastics, woods, composites, and reinforced fiber materials (e.g., fiberglass, carbon fiber, etc.). A plurality of wheels 112 (FIGS. 1, 2, 3, 7, and 9) are operatively coupled to the frame 110 to allow the frame 110 to be easily transported, and the frame 110 may include a storage area 116 (FIG. 9) for housing at least one replacement bag. It is understood that the frame 110 may be collapsible for storage and easy mobility. It is also understood that the wheels may be of a large enough diameter to move easily through tall grass or rough terrain. Preferably, the front wheels will be at least 8 inches in diameter. Further, either the front or the rear wheels are configured to swivel for ease of maneuvering (not shown).

Figure 7:
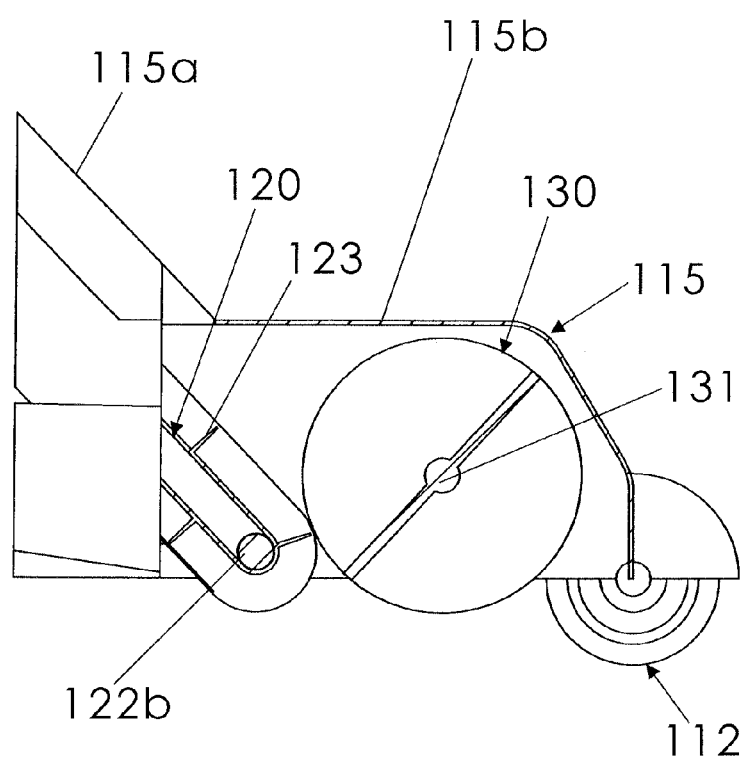
FIG. 7 is a sectional view taken along line 7-7 of FIG. 6.
Figure 8A:
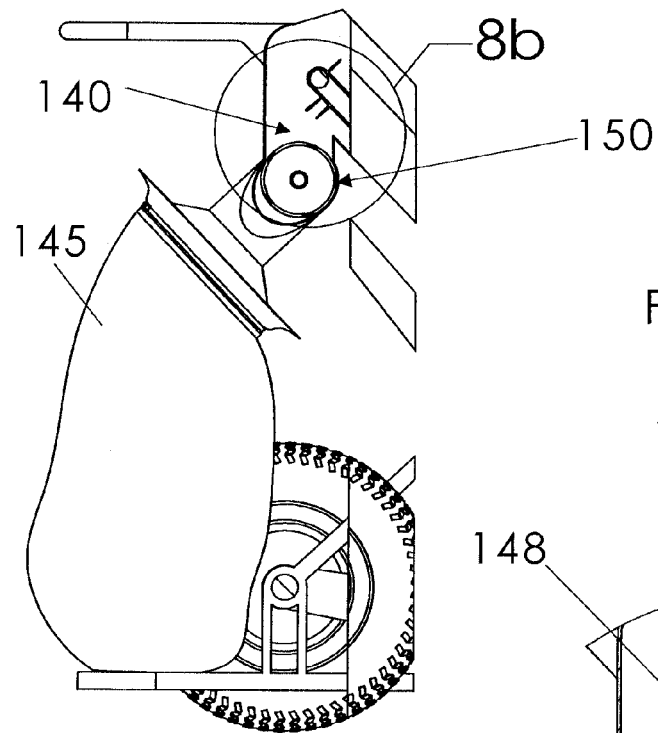
FIG. 8a is a sectional view taken along line 8a-8a of FIG. 6.
Figure 8B:
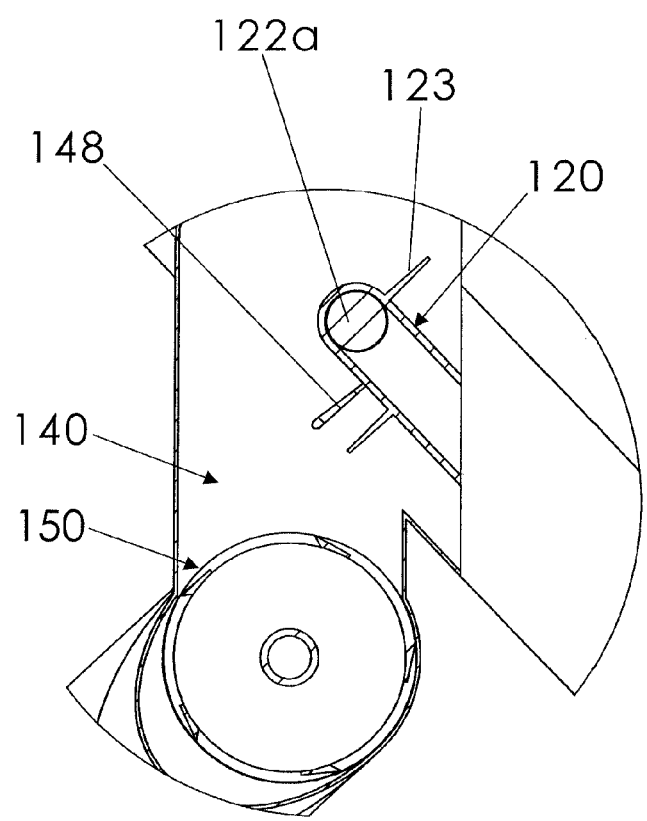

As shown in FIGS. 7 and 8b, upper and lower conveyor axes 122a, 122b are operatively and rotatably coupled to the frame 110, with the upper conveyor axis 122a being above the lower conveyor axis 122b. The conveyor 120 (FIGS. 1, 3, 6, 7, and 8b) extends around the upper and lower conveyor axes 122a, 122b and is continuously rotatable. The conveyor axes 122a, 122b may be constructed of metals, plastics, woods, composites, reinforced fiber materials, rubbers, and/or any other appropriate material, and ball bearings, oil, or other lubricants may be used to reduce friction between the conveyor axes 122a, 122b and the frame 110. The conveyor 120 may be configured to maintain leaves thereon as the conveyor 120 rotates upward toward the upper conveyor axis 122a. For example, the conveyor 120 may include ridges 123 and may be constructed of (e.g., constructed entirely of, or coated with) high-friction material such as rubber.

Figure 2:
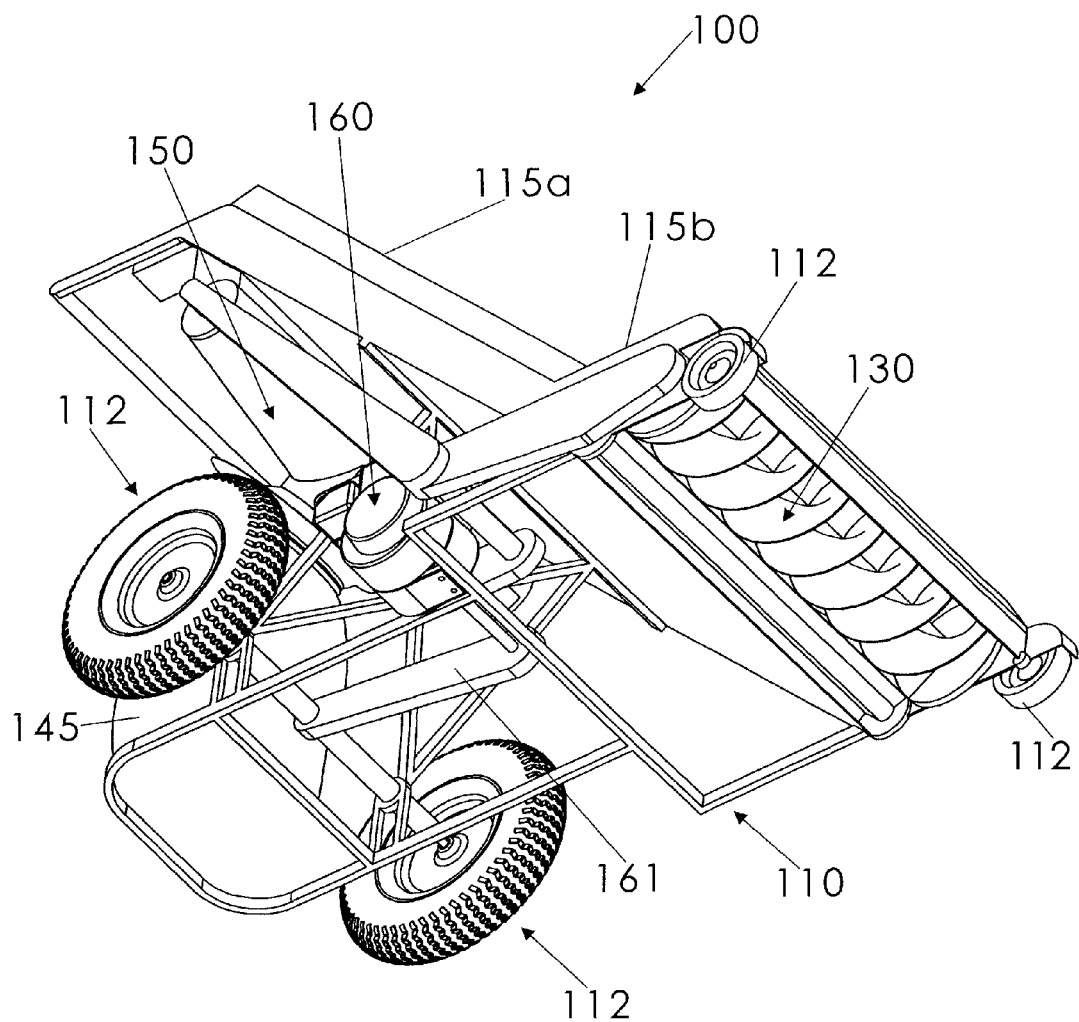
FIG. 2 is bottom perspective of the leaf gathering apparatus as in FIG. 1.

As shown in FIGS. 2 and 7, the rotatable sweeping mechanism 130 has a generally horizontal axis of rotation 131 and is located to move leaves from a ground surface onto the conveyor 120. Like the conveyor axes 122a, 122b, the rotatable sweeping mechanism 130 may be operatively and rotatably coupled to the frame 110, and it may be desirable for the sweeping mechanism 130 to rotate about its axis 131 in the same direction that conveyor axes 122a, 122b rotate. Any appropriate materials and configuration may be used for the sweeping mechanism 130; for example, the sweeping mechanism 130 may include a brush with a plurality of bristles and/or an auger.

To retain leaves in the leaf gathering apparatus 100, the rotatable sweeping mechanism 130 and/or the conveyor 120 may be covered (e.g., by one or more cover 115 that is part of, or coupled to, the frame 110). And in some embodiments, the cover 115 is at least partially transparent to allow the conveyor 120 and/or the sweeping mechanism 130 to be viewed from outside the leaf gathering apparatus 100. In the embodiment 100, a portion 115a of the cover 115 that is atop the conveyor 120 is transparent, while a portion 115b of the cover 115 that is atop the sweeping mechanism 130 is opaque, as shown in FIG. 1.

Figure 9:
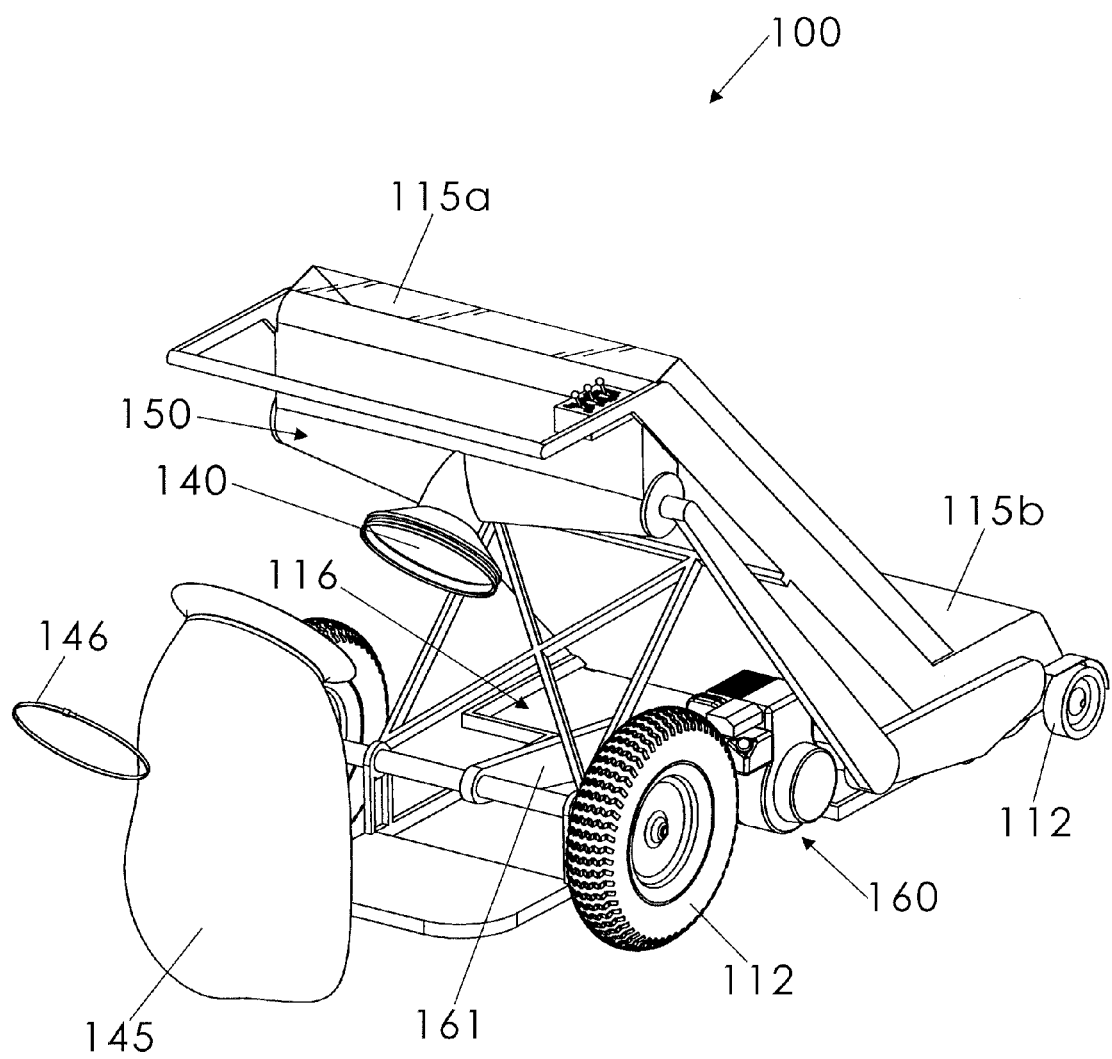
FIG. 9 is another partially exploded view of leaf gathering apparatus as in FIG. 6.

A channel 140 (FIGS. 8a and 8b) extends from the conveyor 120 to a bag 145 in order to direct leaves from the conveyor 120 to the bag 145. The bag 145 may be removably coupled to the channel 140 by a clamp 146 (FIG. 9) or other appropriate fastener, and the channel 140 may be considered part of the frame 110. As shown in FIG. 8b, a wiper blade 148 (e.g., a blade or brush) may be adjacent the conveyor 120 to wipe leaves from the conveyor 120 toward the bag 145. It is understood that at least a portion of the channel 140 may be transparent so that the quantity of leaves in a bag may be seen; if the leaves need to be mashed down, the clamp 146 may be removed quickly for accessing the bag (FIG. 9). Alternatively, the channel 140 may register with the opening of a bag using a hinged or other mechanical linkage such that the channel 140 may be quickly moved away from the bag opening, enabling a user to push down a load of leaves within the bag.

As shown in FIGS. 8a and 8b, a shredder 150 may be located along the channel 140. It may be desirable for the shredder 150 to be (or include) a rotatable shredding device.

Figure 3:
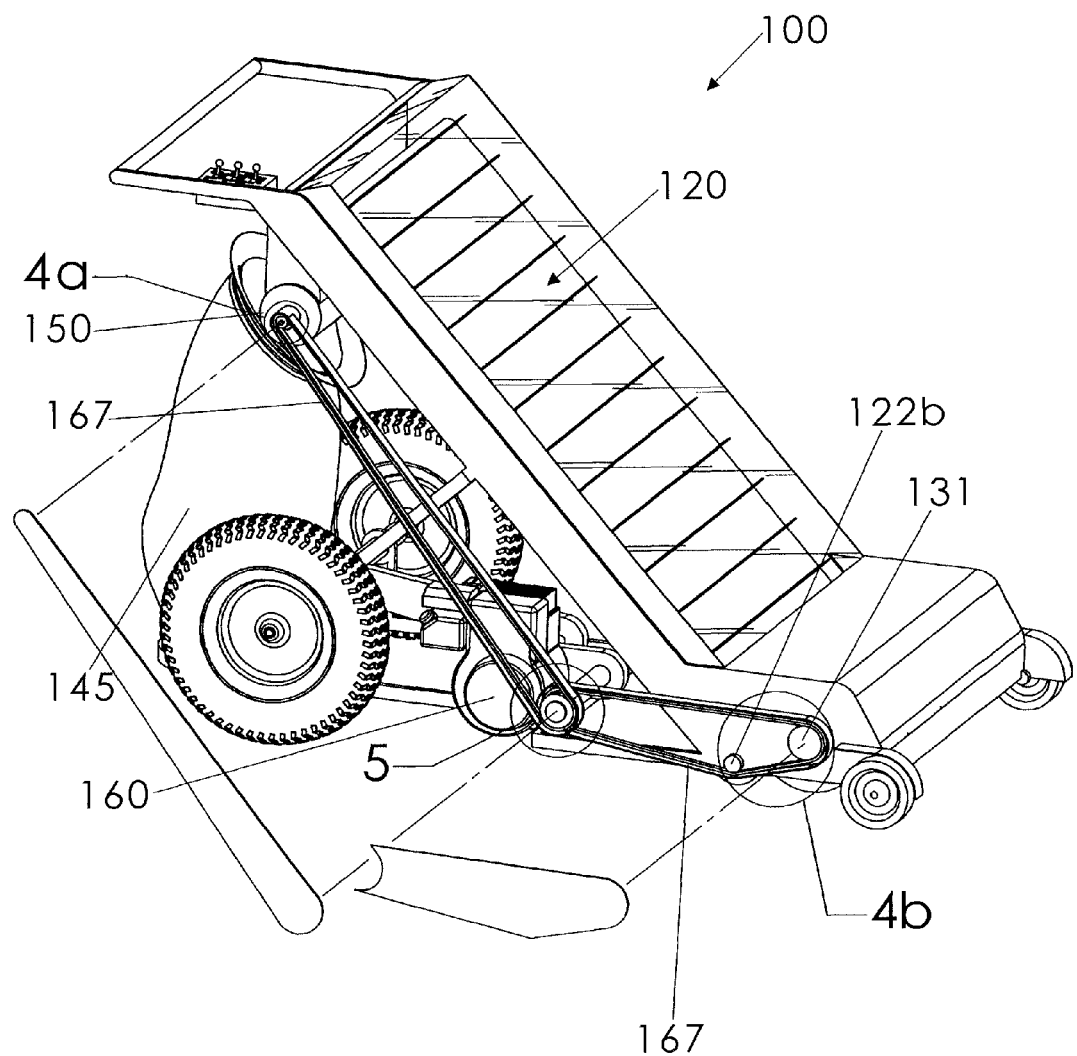
FIG. 3 is a partially exploded side view of the leaf gathering apparatus as in FIG. 1.
Figure 4A:
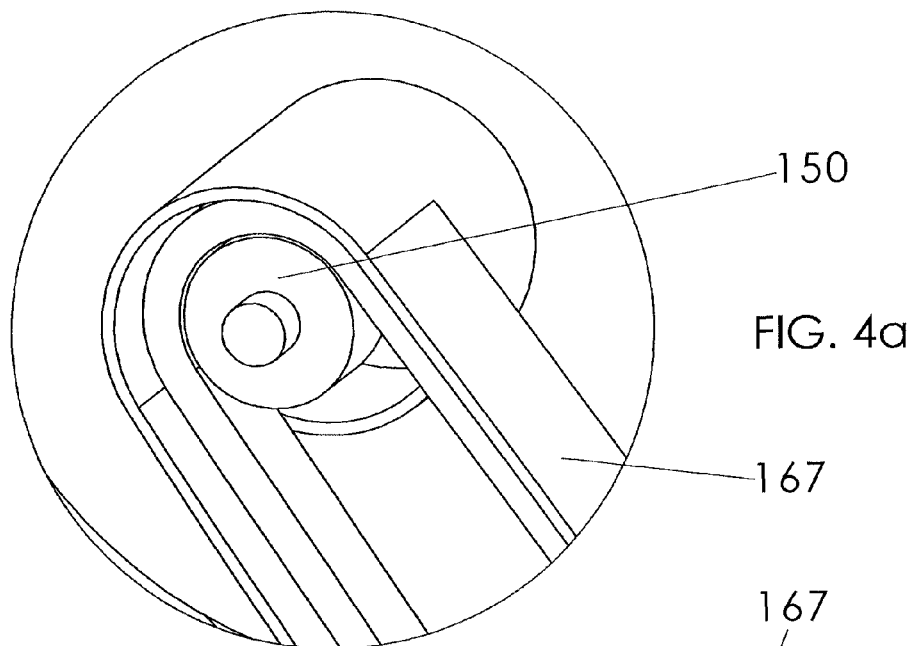
FIG. 4a is an isolated view on an enlarged scale taken from a portion of FIG. 3.
Figure 4B:
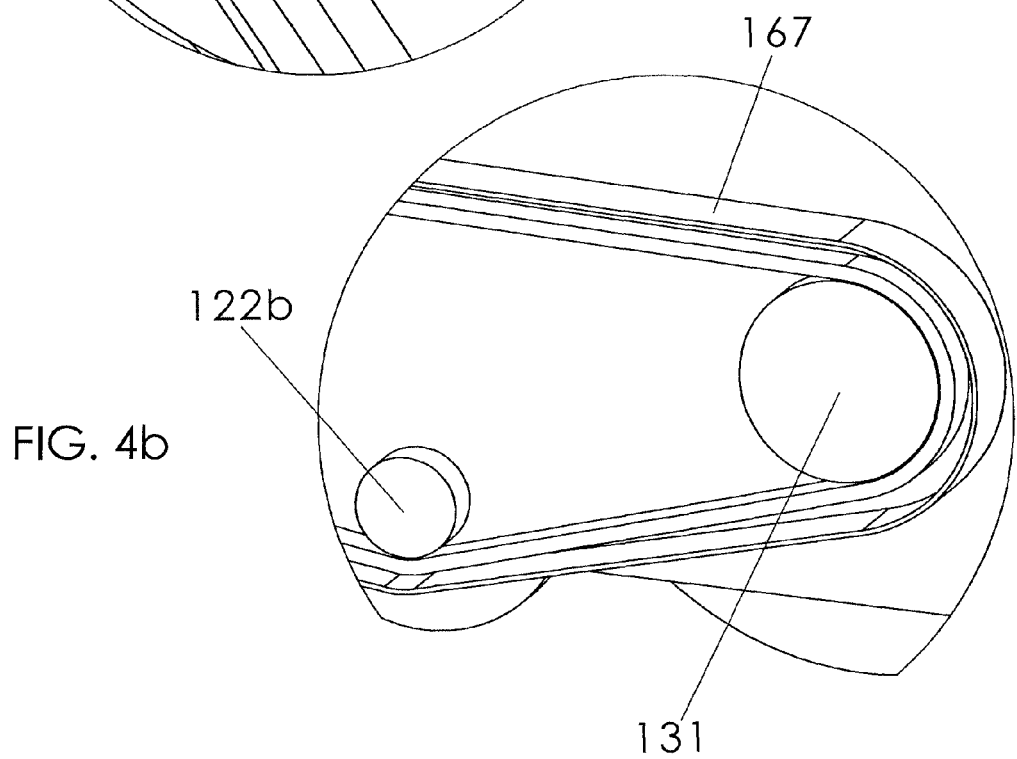
FIG. 4b is an isolated view on an enlarged scale taken from a portion of FIG. 3.
Figure 5:
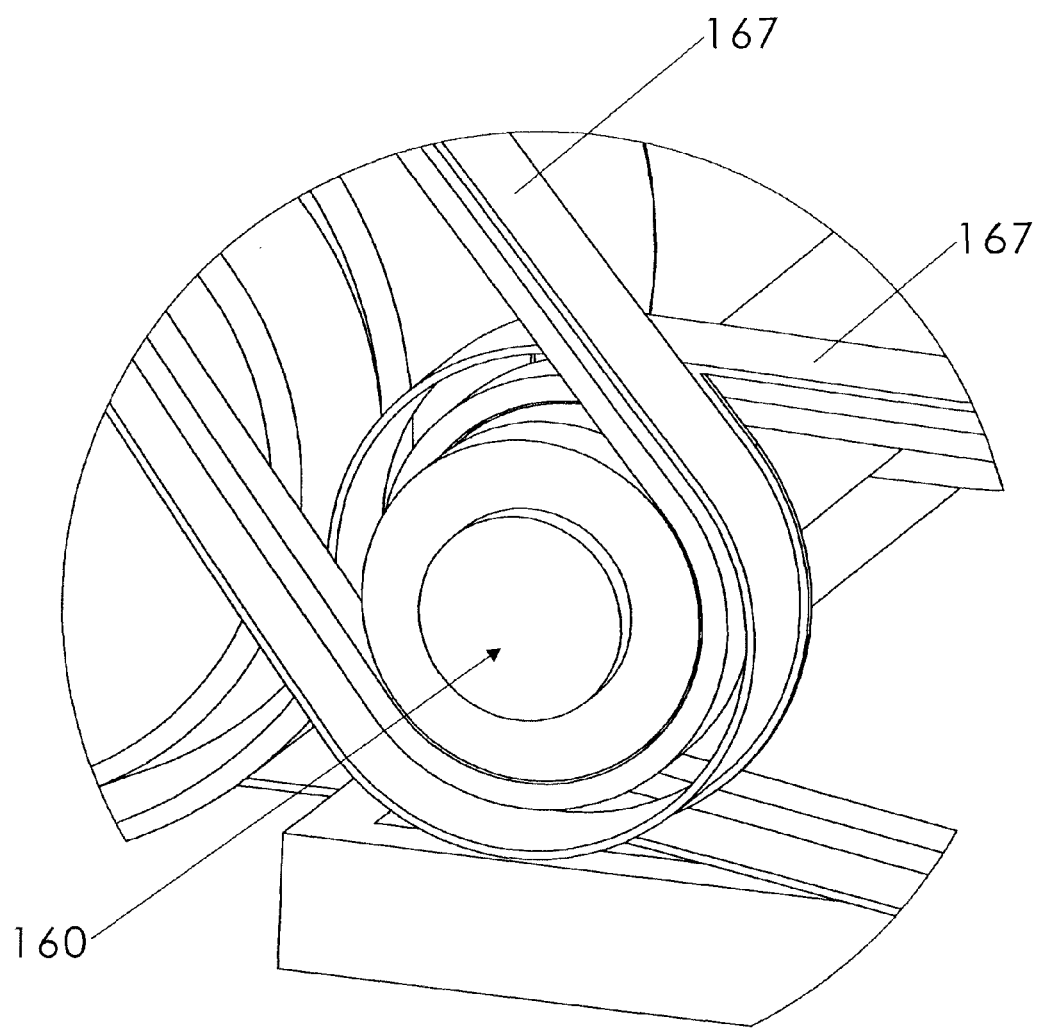
FIG. 5 is an isolated view on an enlarged scale taken from a portion of FIG. 3.
Figure 6:
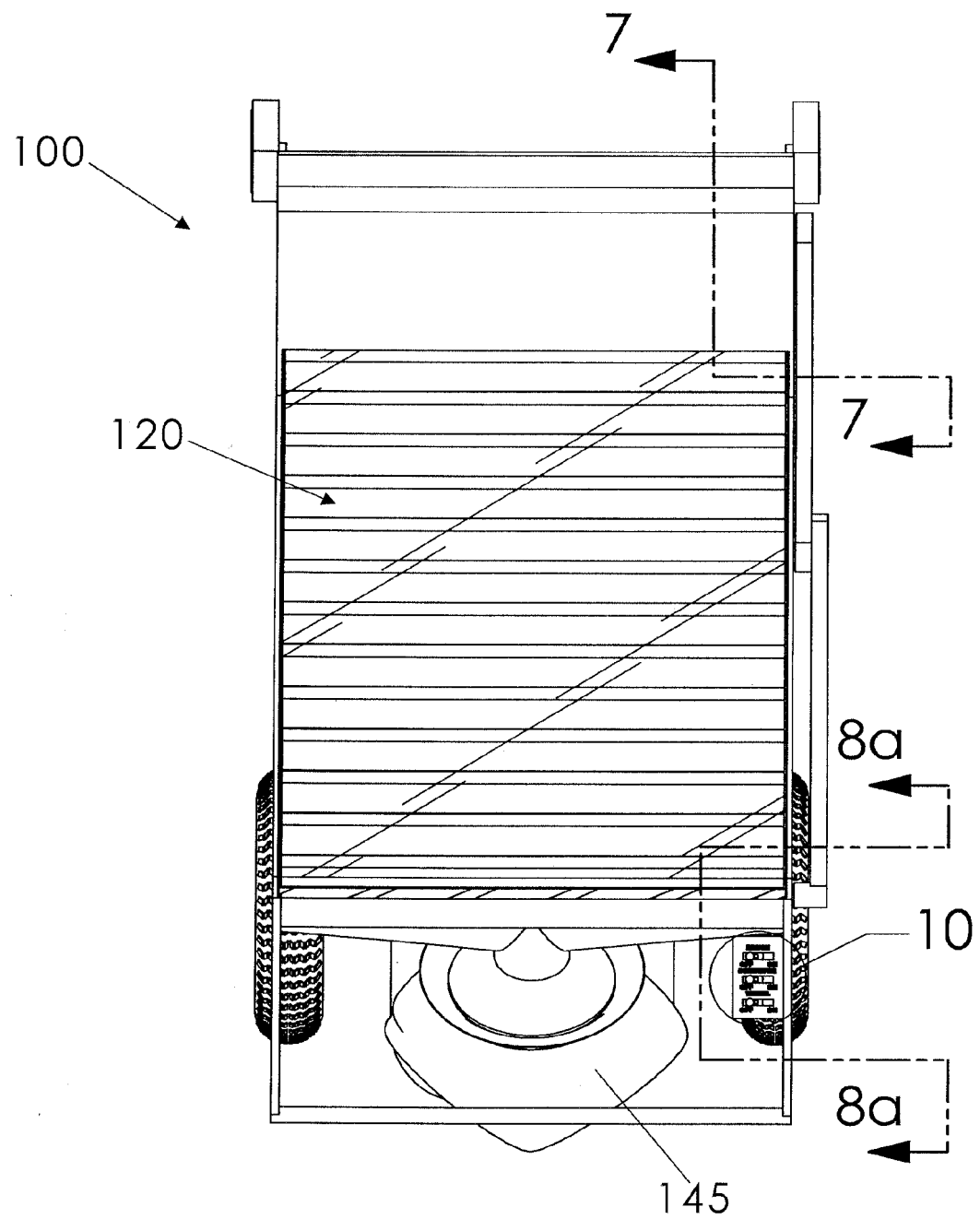
FIG. 6 is a rear perspective view of the leaf gathering apparatus as in FIG. 1.

A motor 160, (e.g., an internal combustion engine, AC motor, DC motor, etc.) may be included (FIGS. 1, 2, 3, and 9) to power elements of the leaf gathering apparatus 100 as shown and described below. Those skilled in the art will appreciate that, while it may be desirable to utilize a single motor 160 (and the embodiment 100 uses a single motor 160), multiple motors 160 may instead be used. The motor 160 may be operatively coupled to the sweeping mechanism 130 (FIGS. 3 and 4b) to rotate the sweeping mechanism 130, operatively coupled to the upper conveyor axis 122a and/or the lower conveyor axis 122b (FIGS. 3 and 4b) to rotate the conveyor 120, operatively coupled to at least one wheel 112 (FIG. 2, inside guard 161) to propel the frame 110, operatively coupled to the rotatable shredding device 150 (FIGS. 3 and 4a) to rotate the shredding device 150, and (though not specifically shown in the drawings) operatively coupled to a rotatable cam adjacent the bag 145 to condense contents of the bag 145 by jostling the bag 145 with the cam. The motor 160 may be operatively coupled to the elements through various power transfer devices, such as belts 167 and pulleys, chains and sprockets, and/or gearing. Further, power transfer devices may be shared; for example, the sweeping mechanism 130 and the lower conveyor axis 122b may share a belt 167 (FIG. 3).

Figure 10:
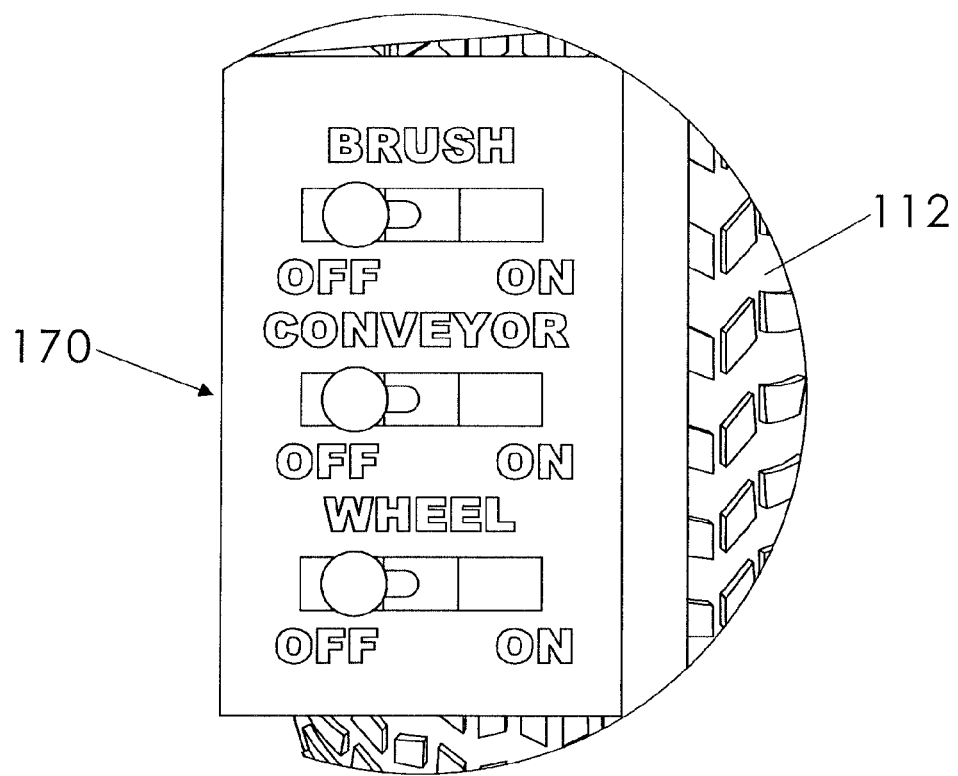
FIG. 10 is an isolated view on an enlarged scale of the user controls.

A user input apparatus 170, shown in FIGS. 1 and 10, may be in communication with means for selectively activating and deactivating rotation of the sweeping mechanism 130, the conveyor 120, and the wheels 112 while the motor 160 produces an output. Various disconnect/transmission devices, such as gear boxes, may be used, as will be understood by those skilled in the art.

In use, the motor 160 may be activated, and the user input apparatus 170 may determine which elements are actuated using power from the motor 160. For example, the leaf gathering apparatus 100 may be propelled by the wheels 112 driven by the motor 160, the conveyor 120 may be rotated by the motor 160, and the sweeping mechanism 130 may be rotated by the motor 160. As the leaf gathering apparatus 100 moves over a ground surface (either from being propelled by the motor 160 or from being pushed by a user), the sweeping mechanism 130 may transfer leaves or other similar debris from the ground surface onto the conveyor 120. The cover 115 may retain the leaves in the leaf gathering apparatus 100 between the sweeping mechanism 130 and the channel 140.

The leaves may fall off the conveyor 120 into the channel 140, and their removal from the conveyor 120 may be aided by the wiper blade 148 wiping the leaves from the conveyor 120 toward the bag 145. As the leaves pass through the channel 140, the shredder 150 may shred the leaves—which then enter the bag 145. The bag 145 may be removed from the channel 140 and discarded or emptied, and then replaced or reattached.

It is understood that while certain forms of this invention have been illustrated and described, it is not limited thereto except insofar as such limitations are included in the following claims and allowable functional equivalents thereof.

The invention claimed is:

1. A leaf gathering apparatus, comprising:
    a frame;
    upper and lower conveyor axes operatively coupled to said frame;
    a conveyor extending around said upper and lower conveyor axes and being continuously rotatable;
    a rotatable sweeping mechanism operatively coupled to said frame and having a generally horizontal axis of rotation, said sweeping mechanism being located to move debris from a ground surface onto said conveyor;
    wherein said rotatable sweeping mechanism is a brush having a plurality of bristles configured to sweep debris from said ground surface onto said conveyor;
    a bag;

a channel extending from said conveyor adjacent said upper conveyor axis to said bag to direct leaves from said conveyor to said bag, said bag being removably coupled to said channel;

wherein said conveyor is configured to maintain leaves thereon between said sweeping mechanism and said channel;

a shredder located along said channel, said shredder and said channel positioned between said upper conveyor axis and said bag;

a motor operatively coupled to said sweeping mechanism to rotate said sweeping mechanism, said motor being operatively coupled to at least one of said upper and lower conveyor axes to rotate said conveyor;

a plurality of wheels operatively coupled to said frame to allow said frame to be easily transported, at least one said wheel being operatively coupled to said motor to propel said frame;

wherein said plurality of wheels includes:
   a pair of rear wheels operatively coupled to a rearward portion of said frame, each of said rear wheels having a diameter to move easily through tall grass;
   a pair of front wheels operatively coupled to a frontward portion of said frame adjacent said rotatable sweeping mechanism and displaced from said pair of rear wheels;

a handle member attached to a rear end of said frame and configured to enable a user to one of propelling said wheels to operate by manual pushing force upon said handle member or guiding said wheels when said wheels are operated by said motor;

wherein:
   said shredder includes a rotatable shredding device;
   said motor is operatively coupled to said rotatable shredding device to rotate said rotatable shredding device;
a user input apparatus;
means for selectively activating and deactivating rotation of said sweeping mechanism while said motor produces an output based on manipulation of said user input apparatus;
means for selectively activating and deactivating rotation of said conveyor while said motor produces an output based on manipulation of said user input apparatus;
means for selectively activating and deactivating rotation of said wheels while said motor produces an output based on manipulation of said user input apparatus;
wherein:
   said rotatable sweeping mechanism and said conveyor include a cover to retain leaves in said leaf gathering apparatus, at least a portion of said cover atop said conveyor is transparent and at least a portion of said cover atop said rotatable sweeping mechanism is opaque;
   said frame includes a horizontally disposed floor defining a storage area configured to retain at least one replacement bag; and
a wiper blade adjacent said conveyor adjacent said upper conveyor axis to wipe leaves from said conveyor toward said bag.

2. The leaf gathering apparatus of claim 1, wherein:
said motor is operatively coupled to said rotatable shredding device by at least one of a belt, chain, and gearing to rotate said rotatable shredding device;
said wheels are operatively coupled to said motor by at least one of a belt, chain, and gearing to propel said frame;
said motor is operatively coupled to said sweeping mechanism by at least one of a belt, chain, and gearing to rotate said sweeping mechanism; and
said motor is operatively coupled to at least one of said upper and lower conveyor axes by at least one of a belt, chain, and gearing to rotate said conveyor.

3. The leaf gathering apparatus of claim 2, wherein said sweeping mechanism axis and said conveyor axes rotate in a common direction.

4. The leaf gathering apparatus of claim 1, wherein said frame is a unitary frame.

5. The leaf gathering apparatus of claim 1, further comprising a rotatable cam adjacent said bag and operably coupled to said motor to condense contents of said bag.

* * * * *